US006099428A

United States Patent [19]
Kashiwase

[11] Patent Number: 6,099,428
[45] Date of Patent: Aug. 8, 2000

[54] CONTINUOUSLY VARIABLE TRANSMISSION

[75] Inventor: Hajime Kashiwase, Tokyo, Japan

[73] Assignee: Fuji Jukogyo Kabushiki Kaisha, Tokyo, Japan

[21] Appl. No.: 09/032,597

[22] Filed: Feb. 27, 1998

[30] Foreign Application Priority Data

Mar. 14, 1997 [JP] Japan ................................. 9-061333

[51] Int. Cl.⁷ .................................................. F16H 47/00
[52] U.S. Cl. ................... 475/68; 475/59; 475/210
[58] Field of Search .................. 192/3.23, 3.24, 192/3.25; 475/35, 36, 47, 58, 59, 68, 210

[56] References Cited

U.S. PATENT DOCUMENTS

| | | | |
|---|---|---|---|
| 2,414,359 | 1/1947 | Carnagua et al. | 475/36 |
| 2,584,469 | 2/1952 | Kelbel | 475/36 |
| 3,435,707 | 4/1969 | Julian | 475/36 |
| 4,018,106 | 4/1977 | Uozumi et al. | 475/47 X |
| 4,077,502 | 3/1978 | Nitsche et al. | 192/3.23 X |
| 5,273,492 | 12/1993 | Kashiwase et al. | 475/43 |

FOREIGN PATENT DOCUMENTS

| | | | |
|---|---|---|---|
| 205065 | 10/1985 | Japan | 475/47 |
| 61-105333 | 5/1986 | Japan . | |
| 7190164 | 7/1995 | Japan . | |
| 2033029 | 5/1980 | United Kingdom . | |
| 2129075 | 5/1984 | United Kingdom | 475/59 |

Primary Examiner—Charles A Marmor
Assistant Examiner—Ha Ho
Attorney, Agent, or Firm—Martin A. Farber

[57] ABSTRACT

A starting apparatus formed by a torque converter is provided between an engine and a continuously variable transmission. A forward and reverse changeover apparatus is formed by a double pinion type planetary gear. Further, a reverse brake is disposed around a ring gear of the planetary gear and a forward clutch is mounted around the reverse brake. A lock-up clutch is provided near the forward clutch. A torque converter case encloses the torque converter, the forward and reverse changeover apparatus, the reverse brake, the forward clutch and the lock-up clutch therein. Since the planetary gear, the reverse brake and the forward clutch are arranged in the radial direction on substantially the same plane, the overall width of the continuously variable automatic transmission can be shortened and the number of components can be reduced.

4 Claims, 3 Drawing Sheets

CONTINUOUSLY VARIABLE TRANSMISSION

BACKGROUND OF THE INVENTION

1. Field of the Invention

The present invention relates to a continuously variable automatic transmission and more particularly to a continuously variable automatic transmission whose overall width is shortened so as to be accommodated in a limited space of an engine room.

2. Prior Arts

In general, a continuously variable automatic transmission used for a motor vehicle comprises a continuously variable transmission which is a main transmission mechanism for controlling vehicle speeds during normal operation, a starting apparatus for controlling power transmission of an engine and transmission during a vehicle starting period, a forward and reverse changeover apparatus and a clutch for engaging and disengaging the forward and reverse changeover apparatus.

For example, Japanese Patent Application Laid-open No. Toku-Kai-Shou 61-105333 discloses a continuously variable automatic transmission using a torque converter as a starting apparatus, as shown in FIG. 2.

This continuously variable transmission 1 is constituted by a starting apparatus 2 directly connected with an engine "A" and including a torque converter 2a therein, a continuously variable transmission 3 and a forward and reverse changeover apparatus 4 provided between the starting apparatus 2 and the continuously variable transmission 3. The forward and reverse changeover apparatus 4 includes a double pinion type planetary gear 4a, a forward clutch 4b and a reverse brake 4c.

When the vehicle runs forward, the forward clutch 4b is engaged so as to rotate the planetary gear 4a integrally with the torque converter 2a and as a result driving force is transmitted directly from the torque converter 2a to a primary pulley 3a of the continuously variable transmission 3. On the other hand, when the vehicle goes backward, the forward clutch is disengaged and at the same time the reverse brake 4c is engaged so as to fix the rotation of a ring gear of the planetary gear 4a and then a sun gear is rotated reversely with reduced speeds with respect to a carrier rotated by a clutch drum of the forward clutch 4b. As a result of the reverse rotation of the sun gear, the primary pulley 3a is rotated reversely.

FIG. 3 is an example of the case where the engine and the transmission are arranged transversely, in which the overall width "W" of the engine "A" and the transmission 1 must be a size to be able to be accommodated in an engine room.

Recent motor vehicles are equipped with a frame 7 in an engine room for absorbing an impact on both sides of the vehicle in case the vehicle has a collision from the lateral direction. Further, a front tire 8 is arranged outside of the frame 7.

The frame 7 must have some extent of a sectional area enough to maintain rigidity for the safety purpose and further the front tire 8 is required to move within as large steering angle as possible in order to obtain a small turning radius.

As a result of these, a space for accommodating the engine "A" and the transmission 1 in the engine room 6a tends to become small, therefore the overall width "W" of the engine and the transmission 1 should be shortened as far as possible.

However, in the continuously variable automatic transmission 1 of the prior art, since the starting apparatus 2 and the forward and reverse changeover apparatus 4 are arranged between the engine "A" and the continuously variable transmission 3 according to the order of the transmission of power, it is technically difficult to shorten the overall width "W'" of the continuously variable automatic transmission 1. Several means such as making a pulley ratio of the continuously variable transmission small, reducing the width of a belt wound around both pulleys, making walls thin, making clearances between components small and the like can be considered. However, any of these means have possibilities of incurring an adverse effect on function of the continuously variable automatic transmission 1 or incurring a lowering in rigidity and strength of the transmission.

Further, Japanese Patent Application Laid-open No. Toku-Kai-Hei 7-190164 discloses a technique in which the overall width of the continuously variable automatic transmission is shortened by means of abolishing a wall for separating a fixed sheave of the primary pulley from the forward and reverse changeover apparatus by supporting both fixed sheave and forward and reverse changeover apparatus with a common wall.

However, this technique has a possibility of exacerbating durability of components because of a long span of length between two bearings for supporting the fixed sheave.

Further, U.K. Published Patent Application No. 2033029 proposes a technique in which the overall width of the continuously variable automatic transmission is reduced by incorporating a single pinion type planetary gear into the inner periphery portion of the torque converter.

This prior technique, however, has a disadvantage that since the reverse brake is disposed on the transmission side, the carrier of the planetary gear must be interconnected with a rotary plate of the reverse brake through a sleeve. Because of this, not only the construction becomes complicated but also the overall width of the automatic transmission becomes long as much as the width of the reverse brake.

SUMMARY OF THE INVENTION

In view of the aforementioned disadvantages of the prior arts, it is an object of the present invention to provide a continuously variable automatic transmission having a short overall width and capable of being installed in a narrow space of the engine room.

To solve these disadvantages, a first feature of the continuously variable automatic transmission according to the present invention is: at least the torque converter, the forward and reverse changeover apparatus, the reverse brake, the forward clutch and the lock-up clutch are accommodated in a torque converter case. A second feature is: at least the forward and reverse changeover apparatus, the reverse brake, the forward clutch and the lock-up clutch are disposed between the torque converter and the engine. Further, a third feature is: at least the forward and reverse changeover apparatus, the reverse clutch and the forward clutch are arranged in the radial direction on approximately the same plane.

DESCRIPTION OF THE DRAWINGS

By way of example only, an embodiment of the present invention will now be described, with reference to the accompanying drawings, in which.

DETAILED DESCRIPTION OF THE INVENTION

Figure 1:
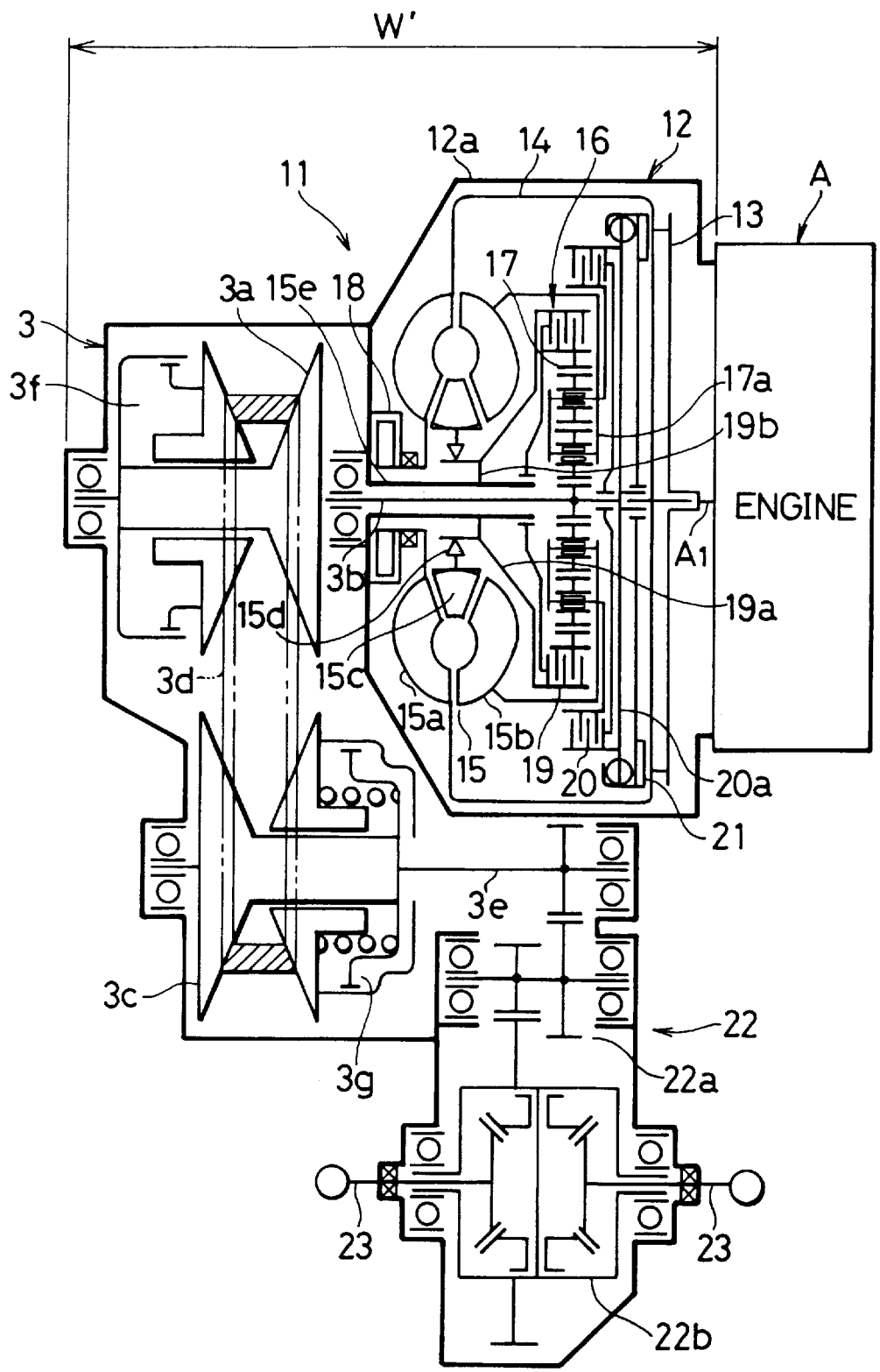
FIG. 1 is a schematic view showing a continuously variable automatic transmission according to an embodiment of the present invention.
Figure 2:
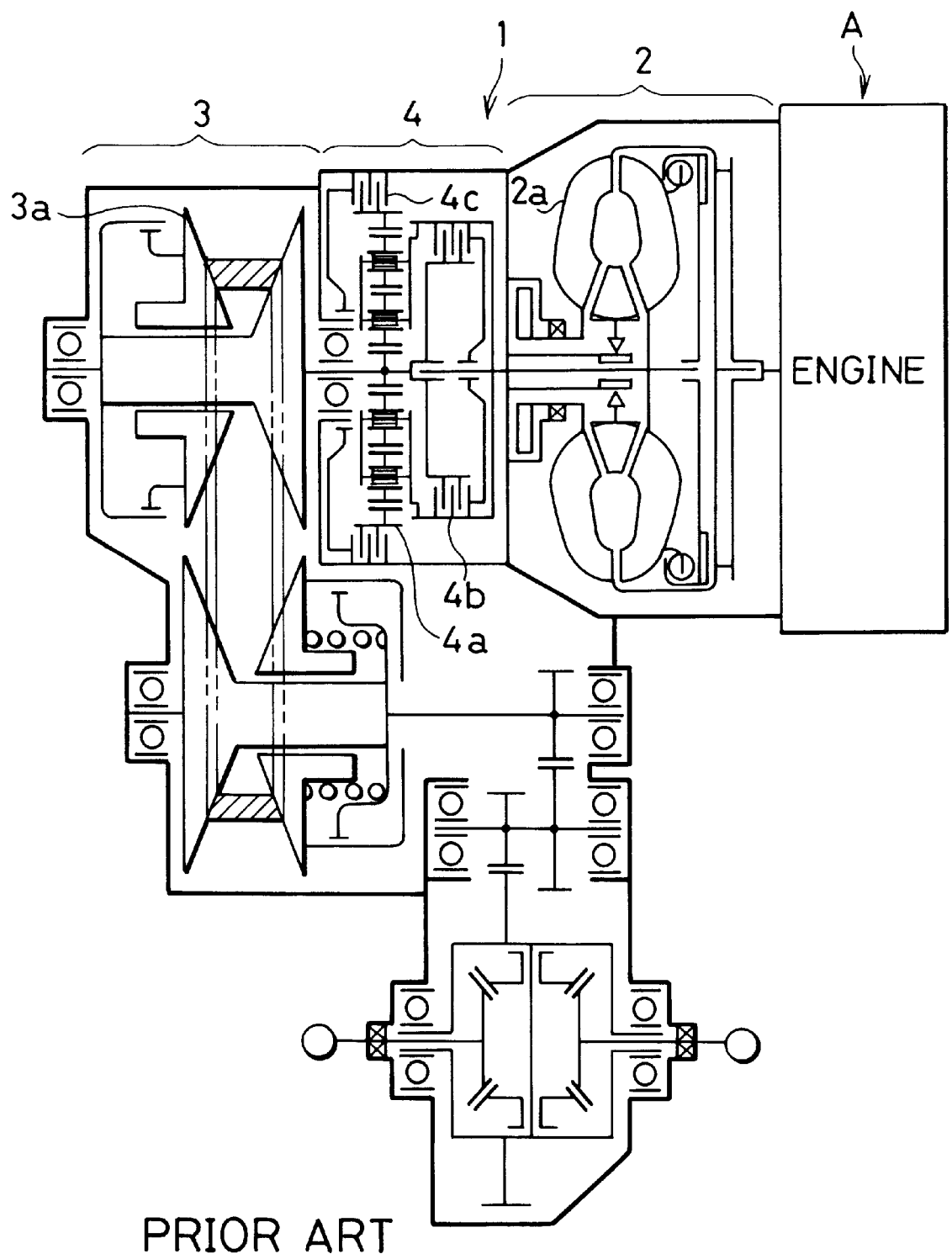
FIG. 2 is a schematic view showing a continuously variable automatic transmission according to a prior art.
Figure 3:
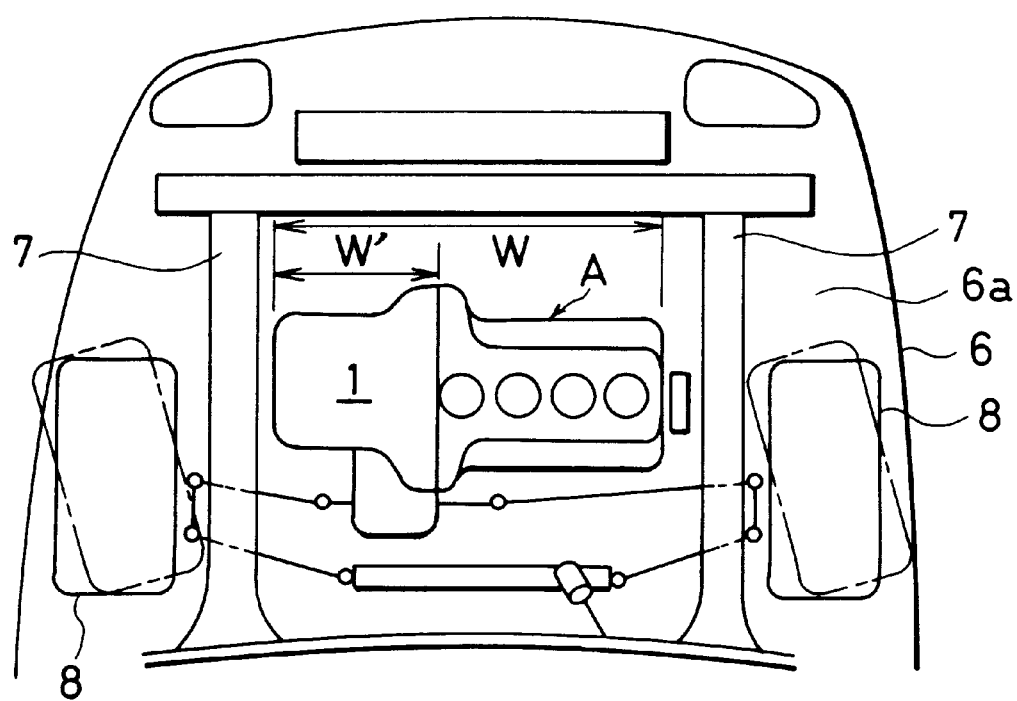
FIG. 3 is a schematic plane view showing a layout of a continuously variable automatic transmission integrally coupled with an engine arranged transversely in an engine room.

Referring now to FIG. 1, reference numeral 11 denotes a continuously variable automatic transmission incorporating a starting apparatus 12 and a continuously variable transmission 3 therein. Further, the continuously variable automatic transmission 11 is integrally coupled on the input side thereof with an engine "A".

The starting apparatus 12 has a fixing plate 13 connected with a crank shaft "A1" of the engine "A" and further this fixing plate 13 is connected with a pump impeller 15a of a torque converter 15 through a torque converter case 14 for accommodating the torque converter 15. Thus, driving force of the crank shaft "A1" is transmitted to the pump impeller 15a through the fixing plate 13 and the torque converter case 14. Further, a turbine runner 15b facing the pump impeller 15a is connected with a carrier 17a of a double pinion type planetary gear 17 provided in a forward and reverse changeover apparatus 16.

Further, a stator 15c of the torque converter 15 is connected through a one-way clutch 15d with a stator shaft 15e which is directly or indirectly fixed to a body case 12a. Further, numeral 18 denotes an oil pump driven by the pump impeller 15a.

In this embodiment, the forward and reverse changeover apparatus 16 is composed of the double pinion type planetary gear 17 provided between the fixing plate 13 and the torque converter 15 in the torque converter case 14. The planetary gear 17 comprises a sun gear which is supported by a pulley input shaft 3b extended from a primary pulley 3a of the continuously variable transmission 3, a double pinion meshing with the sun gear, a ring gear meshing with the double pinion and a carrier 17a connected with the double pinion.

Further, there is provided with a reverse brake 19 on the outer periphery of the ring gear and a reverse brake cylinder 19a of the reverse brake 19 is connected with a cylinder case 19b which is fitted to the stator shaft 15e and movable forward and backward along the stator shaft 15e. When the reverse brake 19 is applied by the reverse brake cylinder 19a, the ring gear is fixed. At this time, when the carrier 17a is rotated by the turbine runner 15b, the double pinion is rotated so as to rotate the sun gear in the reverse direction and as a result the pulley input shaft 3b is rotated in the reverse direction at reduced speeds.

Further, a forward clutch 20 is provided around the reverse brake 19 and a clutch mounting plate 20a for mounting the forward clutch 20 is connected with an end of the pulley input shaft 3b.

The forward clutch 20 overhangs towards the torque converter 15 in such a way that the forward clutch 20 encompasses the reverse brake 19 from the radial direction. Thus, the forward clutch 20, the reverse brake 19 and the planetary gear 17 are accommodated in the torque converter case 14 together with the torque converter 15 and are arranged in the radial direction on almost the same plane.

Further, a lock-up clutch 21 is mounted on the clutch mounting plate 20a which is connected at the center thereof with the pulley input shaft 3b. Thus, the lock-up clutch 21 is disposed adjacent to the forward clutch 20. When the lock-up clutch 21 is engaged, the torque converter case 14 is interlocked with the clutch mounting plate 20a to transmit driving force of the engine A directly to the pulley input shaft 3b without passing through the torque converter 15.

A belt 3d is looped over the primary pulley 3a and a secondary pulley 3c and a pulley output shaft 3e for supporting the secondary pulley 3c is engaged with a differential 22b through a reduction gear set 22a of a speed reduction apparatus 22. Further, a drive shaft 23 is extended from the differential 22b in order to drive a front wheel or a rear wheel.

Primary hydraulic pressure is supplied to a primary oil chamber 3f and secondary hydraulic pressure is supplied to a secondary oil chamber 3g. The primary hydraulic pressure is for establishing a groove width of the primary pulley 3a and the secondary hydraulic pressure is for applying a tension required for torque transmission to the belt 3d. The reduction ratio of the continuously variable transmission 3 is established by changing the groove width of the primary pulley 3a and the secondary pulley 3c respectively. The primary hydraulic pressure and the secondary hydraulic pressure are controlled in a transmission control unit (TCU: not shown) according to engine operating conditions so as to obtain required reduction ratios.

Describing an operation of the continuously variable automatic transmission 1 according to this embodiment, when the vehicle travels forward, the forward clutch 20 is engaged and the reverse brake is released. Accordingly, driving force is transmitted from the turbine runner 15b to the pulley input shaft 3b through the carrier 17a, the forward clutch 15b and the clutch mounting plate 20a.

On the other hand, when the vehicle travels backward, the reverse brake 19 is engaged and the forward clutch 20 is disengaged. As a result, the ring gear 17 of the forward and reverse changeover apparatus 16 is fixed. Since the ring gear 17 is fixed, when driving force is transmitted from the turbine runner 15b to the carrier 17a, the double pinion supported by the carrier 17a is rotated in the reverse direction and the pulley input shaft 3b is rotated in the reverse direction at reduced speeds.

When both forward clutch 20 and reverse brake 19 are released, the planetary gear 17 idles and at this moment the transmission enters into a neutral condition.

Further, when the lock-up clutch 21 is engaged, the crank shaft "A1" of the engine 1 is directly connected with the pulley input shaft 3b through the fixing plate 13, the lock-up clutch 21 and the clutch mounting plate 20a, that is to say, the transmission enters into a lock-up condition.

In summary, according to the present invention, since the forward clutch, the reverse brake and the planetary gear are arranged in the radial direction on almost the same plane, and furthermore since these three components are accommodated together with the torque converter in a torque converter case, not only the overall width of the continuously variable automatic transmission can be substantially reduced, but also the reduction of the number of components and the simplification of the construction can be realized.

Further, since the forward and reverse changeover apparatus is built in the starting apparatus, the assembly cost can be reduced.

Furthermore, since the lock-up clutch is disposed near the outer periphery of the forward clutch, the width of the starting apparatus can be shortened, this leading to the reduction of the overall width of the continuously variable automatic transmission.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A transmission system having a continuously variable automatic transmission apparatus directly and mechanically connected to an internal combustion engine of a vehicle, wherein said transmission system is mounted laterally in a front portion of said vehicle, wherein the vehicle includes a pair of steering wheels located on both left and right sides of said transmission system for steering said vehicle, and wherein said vehicle comprises a frame which surrounds said both left and right sides and a front side of said transmission system for absorbing an impact upon occurrence of a collision, the transmission system comprising:

a torque converter interposed between said engine and said continuously variable automatic transmission apparatus for controlling torque transmitting conditions therebetween;

clutch means provided on an outer periphery of said torque converter and interposed between said torque converter and said engine for connecting and disconnecting a torque from said engine in accordance with driving conditions of said vehicle;

a forward and reverse changeover apparatus included in said clutch means for changing a running direction of said vehicle so as to effectively utilize a space within said frame and to shorten a width of said transmission system in a lateral direction of said front portion of said vehicle; and a reverse brake interposed between said torque converter and said engine for engaging thereof when said running direction is in a reverse rotating condition.

2. The transmission system according to claim 1, wherein said clutch means comprises a forward clutch and said reverse brake;

at least said forward and reverse changeover apparatus, said reverse brake and said forward clutch are arranged in a radial direction about an axis of said transmission system on approximately a common plane;

connection of the continuously variable automatic transmission apparatus to the engine is via a crankshaft of the engine;

said torque converter interposed between said engine and said continuously variable automatic transmission apparatus controls torque transmitting conditions therebetween;

said torque converter comprises an impeller and a turbine runner for variably transmitting torque from said engine to driving wheels by stirring an oil in said torque converter;

the transmission system further comprises a fixed plate coaxially and fixedly connected between said crankshaft and said impeller;

said clutch means is coaxially and mechanically interposed between said fixed plate and said turbine runner for connecting and disconnecting to transmit torque; and the transmission apparatus further comprises a planetary gear system provided within said clutch means for changing a running direction of said vehicle so as to provide a configuration of the transmission system to accommodate a space within said frame in a lateral direction of said front portion of the vehicle.

3. The transmission system according to claim 1, wherein said clutch means comprises a forward clutch, said reverse brake and a lock-up clutch; and said lock-up clutch is located in the vicinity of said forward clutch.

4. The transmission system according to claim 3, wherein said forward and reverse changeover apparatus, said reverse brake and said forward clutch are provided between said lock-up clutch and said torque converter.

* * * * *